United States Patent [19]

Anderson

[11] 4,015,650

[45] Apr. 5, 1977

[54] CAGED NUT

[76] Inventor: James C. Anderson, 5011 Whites Bridge Road, Smyrna, Mich. 48887

[22] Filed: Aug. 15, 1975

[21] Appl. No.: 605,198

[52] U.S. Cl. .............................. 151/41.76; 85/32 K

[51] Int. Cl.² .............................. F16B 39/00

[58] Field of Search ................ 151/41.76, 44, 41.7, 151/41.75; 85/32 K; 24/22 R, 22 A

[56] References Cited

UNITED STATES PATENTS

| | | | |
|---|---|---|---|
| 1,405,994 | 2/1922 | Fisher | 151/41.75 |
| 1,521,658 | 1/1925 | Tomkinson | 85/32 K |
| 1,545,402 | 7/1925 | Coyne | 85/32 K |
| 2,334,046 | 11/1943 | Tinnerman | 24/221 A |
| 2,495,037 | 1/1950 | Tinnerman | 85/32 K |
| 2,716,434 | 8/1955 | Crowther | 151/41.76 |
| 2,820,499 | 1/1958 | Schaaf | 151/41.7 |

OTHER PUBLICATIONS

Teed, Abstract of *Ser. No.* 224,367, filed May 3, 1951, Published in vol. 669 of O.G., p. 923, on Apr. 21, 1953.

*Primary Examiner*—James T. McCall
*Assistant Examiner*—Rodney H. Bonck
*Attorney, Agent, or Firm*—McGarry & Waters

[57] ABSTRACT

A caged nut for mounting a threaded nut on a surface comprises a housing of box-like structure enclosing an internally threaded nut. The housing is formed of a single blank of sheet metal and comprises a square central section with a clearance hole therethrough and two end walls and two side walls extending at right angles from the respective opposed edges of the central section. Mounting flanges extend outwardly at right angles from the ends of the end walls, and locking flanges extend inwardly from the ends of the side walls. Locking tabs extend outwardly from the sides of the locking flanges and engage openings in the mounting flanges. The engagement of the locking tabs in the openings in the mounting flanges prevents the side walls from spreading outwardly due to a rotational force being placed on the nut.

5 Claims, 5 Drawing Figures

10 36 24 12 32 20 38 19 18 20 26 28

CAGED NUT

BACKGROUND OF THE INVENTION

1. Field of the Invention

The present invention relates to a caged nut for retaining a threaded nut in limited lateral and rotational movement, and more particularly to a caged nut comprising a housing having a means for restrictively retained the vertical walls from outward movement.

2. Description of The Prior Art

Caged nuts are nuts enclosed in a box-like housing that is adapted to be mounted over a bolt opening in a surface. The cage holds the nut in place and prevents rotation or other movement of the nut when a bolt is threaded into the nut. Caged nuts are particularly useful when the nut is to be placed in an inaccessible position where it cannot be reached by hand or a wrench.

One problem with a caged nut is that threading a bolt into the nut exerts a torsional force on the nut and this in turn exerts a spreading force on the side walls of the cage. Unless the side walls are constrained in some manner, the walls eventually spread so far apart that the nut can turn in the cage.

In the past, several different devices have been developed to retain the vertical walls of a housing from spreading outwardly when a bolt is torqued into the threaded nut contained in the housing. One such method involves forming mounting flanges on all of the side walls and welding or bolting each mounting flange to the structure being bolted. One problem with this arrangement is that it is unnecessarily expensive and time consuming to fasten all four mounting flanges to the surface. In addition, in this type of arrangement, the nut is loose in the case and can be removed until such time that the cage and nut are attached to a surface. This is undesirable because it makes the mounting more difficult and makes it easier to lose the nut.

Another method for preventing spreading of the vertical walls of a caged nut employs a housing for the nut and a separate retaining member attached to the structure that engages and holds the side walls in place. This type of arrangement is expensive.

Still another method for retaining the vertical walls comprises mounting two end walls to the structure by means of mounting flanges extending therefrom and securing the position of the other walls by welding those walls to the fixed position walls. This method increases the cost of the assembly and still does not provide a method for holding the nut inside the housing at all times.

In still another method for retaining the vertical walls of a caged nut housing, the end walls have outwardly extending mounting flanges and the side walls have flanges that extend inwardly. The inner edges of these flanges are formed into upwardly extending semi-circular pilot flanges, which are disposed into an oversized volt clearance opening formed in the panel on which the caged nut is to be mounted. These pilot flanges restrain the outward movement of the side walls when the retainer is secured tightly to the panel.

SUMMARY OF THE INVENTION

In accordance with the present invention, a caged nut for mounting a nut on a surface comprises a nut having a threaded opening therethrough and a housing for enclosing the nut and limiting lateral and rotational movement thereof. The housing comprises a central section abutting one side of the nut and having a bolt clearance opening therethrough that mates with the opening of the nut. Vertical walls extend at right angles from the central section and terminate in outer ends. The walls include two opposed end walls and two opposed side walls that form the sides of a box having a rectangular cross section. The vertical walls are positioned so as to be adjacent the edges of the nut and prevent the nut from rotational movement. Mounting flanges for mounting the caged nut on a surface extend outwardly from the outer edges of the end walls. Locking flanges extend inwardly from the outer edges of the side walls. Locking tabs extend outwardly from the sides of the locking flanges. A retaining mechanism in the mounting flanges or end walls engages and hold the locking tabs in place, so as to prevent the side walls from spreading apart when a spreading force is exerted on the side walls by rotation of the nut inside the cage.

In one aspect of the present invention, the retaining means comprises openings in the end walls or mounting flanges such that the locking tabs fit into the openings and are retained in place thereby.

In a preferred embodiment of the present invention, the locking flanges extend into abutment with each other, and mating semi-circular openings are formed in the center of the abutting ends of the locking flanges such that the mating openings form a single opening that mates with the opening in the nut. The locking tabs extend from the sides of the abutting ends of the locking flanges such that a single opening in the center of each mounting flange accommodates and retains the locking tabs for both locking flanges.

These and other advantages and features of the present invention will hereinafter appear, and, for purposes of illustration, but not of limitation a preferred embodiment of the subject invention is described in detail below and shown in the appended drawings.

DETAILED DESCRIPTION OF THE PREFERRED EMBODIMENT

Figure 1:
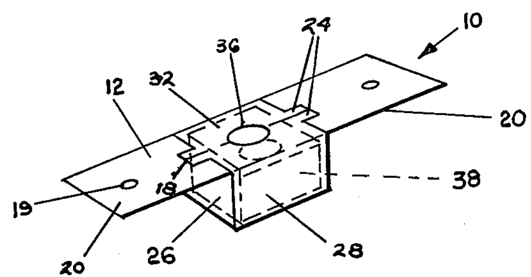
FIG. 1 shows a perspective view of a preferred embodiment.

Referring now to the drawings, FIG. 1 illustrates a preferred embodiment of a caged nut 10 with a square threaded nut 38 enclosed in a housing or cage 12. The housing or cage comprises a square central section 16, vertical end walls 26 and vertical side walls 28 extending perpendicularly from the edges of central section 16, and mounting flanges 20 extending outwardly from the ends of end walls 26.

Locking flanges 32 extend inwardly from the ends of side walls 28 so as to enclose the threaded nut. Locking tabs 24 extend laterally from the sides of the inner ends of locking flanges 32, and these tabs fit into apertures 18 formed in mounting flanges 20. The engagement of tabs 24 in apertures 18 prevents the side walls from spreading apart when a substantial torsional force is exerted on the nut enclosed by the housing.

The housing or cage of the present invention is formed simply from a single sheet metal blank, as shown in FIGS. 2–5. This process is described for illustrative purposes in a step by step manner. However, the actual process employed for forming the housing does not have to be performed in this manner.

Figure 2:
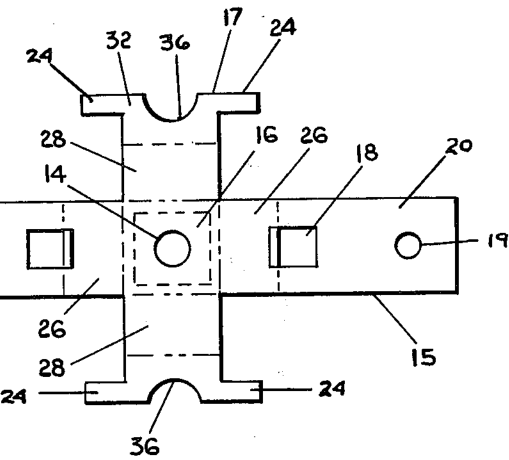
FIG. 2 is a plan view of the metal blank from which the housing is formed.

The sheet metal blank 13 from which housing or cage 12 is formed is shown in FIG. 2. Blank 13 comprises square central section 16 and four generally rectangular arms extending outwardly from the sides of the central section. Two arms 15 extend horizontally outwardly from two opposed vertical sides of central section 16, and two arms 17 extend vertically outwardly from two horizontal edges of central section 16 (FIG. 2 orientation).

Horizontal arms 15 comprise end walls 16 and mounting flanges 20, with each end wall 26 being attached to the edge of central section 16 at an inner end and being attached to a mounting flange 20 at an outer end. Aperture 18 for locking tabs 24 is formed in each mounting flange 20 at the junction of the mounting flanges and the end wall. Preferably the aperture extends slightly into the end wall, as shown in FIG. 2, so that the locking tabs will lie flush with the mounting flanges when the housing is assembled.

The mounting flanges also include mounting openings 19 therein for mounting the caged nut on a suitable surface by means of a conventional fastener. The mounting openings are not critical, however, as the caged nut could be mounted on a surface in any number of ways that could eliminate the need for a mounting opening, as by welding the flanges to the surface.

Vertical arms 17 include side walls 28 attached to the edge of central section 16 and locking flanges 32 attached to outer ends of the side walls. Locking flanges 32 have semi-circular cut outs 36 on the outer ends thereof that mate with clearance hole 14 in central section 16 when the housing is in its formed or assembled shape. Locking tabs 24 extend laterally outwardly from each side of the outer end of each locking flange. As stated above, these locking tabs are formed so as to fit into aperture 18.

Figure 3:
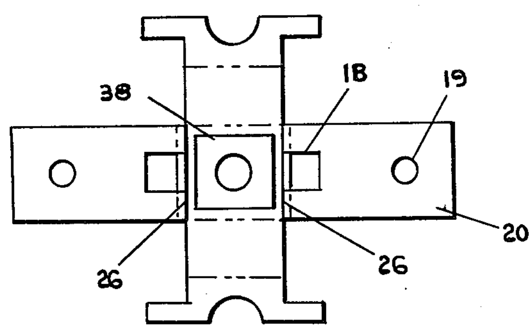
FIG. 3 is a plan view of the metal blank showing the end walls and the outwardly extending mounting flanges formed in position.
Figure 4:
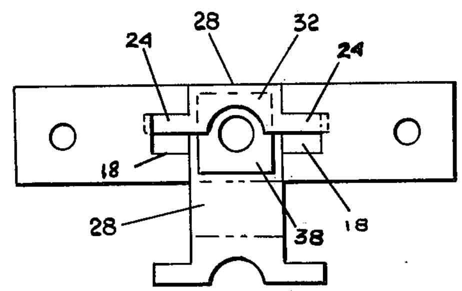
FIG. 4 is a plan view showing one-half of the base formed and the locking tabs in place.
Figure 5:
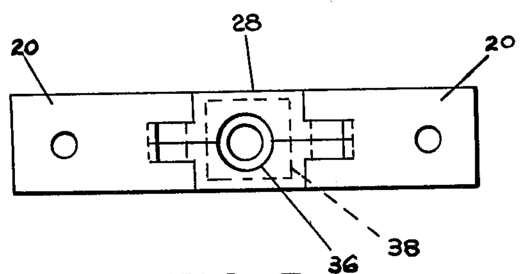
FIG. 5 is a plan view showing the completed assembly of the preferred embodiment.

The assembly of the caged nut of the present invention is described in an illustrated step by step process in FIGS. 3–5. FIG. 3 illustrates the first step of forming the housing 12 by bending end walls 26 upwardly at right angles from central section 16. Mounting flanges 20 are formed by bending them outwardly from end walls 16 at right angles thereto.

The forming of one side wall 28 and locking flange is shown in FIG. 4. Vertical arm 17 is bent upwardly at right angles to central section 16, properly positioning side wall 28. Locking flange 32 is then bent inwardly at right angles to side wall 28. The locking tabs 24 extending outwardly from the sides of locking flange 32 are positioned into aperture 18, securing side wall 28 from outward movement.

The other side wall 28 and locking flange 32 are formed in substantially the same manner, as shown in FIG. 5. The nut of course must be placed in the housing at least before this step. When both locking flanges are in place, the semi-circular openings in the outer ends of the locking flanges mate and form an opening for the belt to pass through. Also the locking tabs 24 on both locking flanges fit into the same openings 18.

To use the caged nut of the present invention, the housing is placed flush over a bolt opening in the surface or panel to which the caged nut is to be attached and is mounted in place by means of suitable fasteners passing through openings 19 in the mounting flanges. The mating openings 13 and 36 are positioned so as to mate with the bolt opening in the surface. A bolt passed the surface, passes through the cage and engages the threaded opening in the nut. The cage holds the nut securely in place while the bolt is threaded into the nut. The attachment of the mounting flanges to the surface prevents spreading of the end walls when a torsional force is exerted on the nut, and the engagement of the locking tabs 24 in the apertures 18 prevents spreading of the side walls under the same circumstances.

Reasonable variations and modifications may be made in the exemplary embodiment described herein and shown in the appended drawings without departing from the spirit and scope of the present invention.

The embodiments of the present invention in which an exclusive property or privilege is claimed and defined as follows:

1. A caged nut for mounting a threaded nut on a surface comprising:

a nut having a threaded opening therethrough;

housing means for enclosing the nut and limiting lateral and rotational movement thereof, said housing means comprising:

a central section abutting one side of the nut with a bolt clearance opening therethrough mating with the opening in the nut;

vertical walls extending at right angles from the central section and terminating in outer ends, said walls including two opposed ends walls and two opposed side walls that form the sides of a box, said vertical walls being positioned to be adjacent to the edges of the nut so as to prevent the nut from rotational movement;

mounting flanges extending outwardly from the outer ends of the end walls, each end wall and attached mounting flange constituting a single arm member;

locking flanges extending inwardly from the outer ends of the side walls;

locking tabs extending outwardly from the sides of the locking flanges; and retaining means in the arm members for engaging and holding the locking tabs in place so as to prevent the side walls from spreading apart when a spreading force is exerted on the side walls by rotation of the nut, said retaining means comprising openings in the arm members that receive and retain the locking tabs.

2. A caged nut according to claim 1 wherein the housing is formed from a single sheet metal blank with no welded junction.

3. A caged nut for mounting a threaded nut on a surface comprising:

a nut having a threaded opening therethrough;

housing means for enclosing the nut and limiting lateral and rotational movement thereof, said housing means comprising:

a central section abutting one side of the nut with a bolt clearance opening therethrough mating with the opening in the nut;

vertical walls extending at right angles from the central section and terminating in outer ends, said walls including two opposed end walls and two opposed side walls that form the sides of a box, said vertical walls being positioned to be adjacent to the edges of the nut so as to prevent the nut from rotational movement;

mounting flanges extending outwardly from the outer ends of the ends walls, each mounting flange and attached end wall constituting a single arm member;

locking flanges extending inwardly from the outer ends of the side walls, the locking flanges extending into abutment with each other and including mating openings in the abutting ends such that the mating openings form a single opening that mates with the opening in the nut;

locking tabs extending outwardly from the sides of the locking flanges at the abutting ends thereof such that the locking tabs on each side of both locking flanges are side-by-side; and retaining means in the arm members for engaging and holding the locking tabs in place so as to prevent the side walls from spreading apart when a spreading force is exerted on the side walls by rotation of the nut, said retaining means comprising a single opening in each arm member that receives and retains the locking tabs for both locking flanges.

4. A caged nut according to claim 3 wherein the opening in each arm member is formed at least partially in the mounting flange, the openings in the mounting flanges being sufficiently large to permit the locking tabs to be inserted downwardly into the opening in the mounting flange by folding the locking flanges over the nut after the end walls and mounting flanges have been folded into shape, the opening in each mounting flange extending all the way to the junction of the mounting flange and end wall and being formed such that the locking flanges can be folded down so as to be flush with the mounting flanges, with the locking tabs nested completely in the opening in the mounting flanges.

5. A cage for mounting a nut to a surface, said cage being formed from a single blank of sheet material and comprising:

a square central section having an opening therethrough that mates with the opening in the nut;

end walls extending at right angles from two opposed edges of the central section;

mounting flanges extending at right angles outwardly from the outer ends of the endwalls, said mounting flanges each having at least one opening therein extending outwardly from the outer end of the end wall, said end walls being formed so as to prevent rotation of the nut within the cage;

side walls extending adjacent the end walls at right angles from the other two edges of the central section, said side walls being formed so as to prevent rotation of the nut within the cage;

locking flanges extending inwardly at right angles from the outer ends of the side walls, said locking flanges extending into abutment with each other and including mating openings in the abutting ends that mate with the opening in the nut; and locking tabs extending outwardly from the sides of the abutting ends of the locking flanges, said locking tabs nesting in the openings in the mounting flanges such that the engagement of the locking tabs in the openings resists the outward spreading of the side walls due to a torsional force being exerted on the nut.

* * * * *